(12) United States Patent
Wils et al.

(10) Patent No.: US 6,678,277 B1
(45) Date of Patent: Jan. 13, 2004

(54) EFFICIENT MEANS TO PROVIDE BACK PRESSURE WITHOUT HEAD OF LINE BLOCKING IN A VIRTUAL OUTPUT QUEUED FORWARDING SYSTEM

(75) Inventors: Joris Johannes Maria Wils, Acton, MA (US); Benny Siman-Tov, Framingham, MA (US); Kenneth Gerard Descoteaux, Stow, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/436,893

(22) Filed: Nov. 9, 1999

(51) Int. Cl.$^7$ .............................................. H04L 12/28
(52) U.S. Cl. ...................................................... 370/412
(58) Field of Search ................................. 370/412, 395, 370/230–239, 462–465, 390–398, 411–418, 389, 218–224, 258, 402; 707/1, 10, 204; 712/225; 711/161, 113; 725/134, 135, 105, 240; 375/240, 222

(56) References Cited

U.S. PATENT DOCUMENTS

| | | | | |
|---|---|---|---|---|
| 5,367,520 A | * | 11/1994 | Cordell ........................ | 370/395 |
| 5,530,902 A | * | 6/1996 | McRoberts et al. .......... | 370/389 |
| 5,818,842 A | * | 10/1998 | Burwell et al. .............. | 370/397 |
| 5,968,167 A | * | 10/1999 | Whittaker et al. ........... | 712/225 |

OTHER PUBLICATIONS

Li, S.; Chen, J.–G; Ansari, N., Fair queuing for input–buffered switches with back pressure, Jun. 22–24, 1998, IEEE International Conference, pp. 252–259.*
Badran, H. F; Mouftah, H. T., Input–Output buffered ATM switches with delayed back pressure mechanisms, Sep. 14–17, 1993, IEEE Canadian Conference Electrical and Computer Engineering, vol. 2, pp. 771–774.*
Iliadis, I.; Denzel, W. E., Performance of packet switches with input and output queuing, Apr. 1990, IEEE CNF, vol. 2, pp. 747–753.*

* cited by examiner

Primary Examiner—Chi Pham
Assistant Examiner—Prenell Jones
(74) Attorney, Agent, or Firm—McGlew and Tuttle, P.C.

(57) ABSTRACT

A plurality of Buffer Management (BM) modules or chips communicate through each other through an interconnect. The BM modules receive packets from other parts of the network or external circuitry. These incoming packets are stored in an ingress pool. Data packets that a BM module receives from the interconnect are stored in a egress pool. The BM module takes the packets from the ingress pool and sends the packets across the interconnect to one of the other BM modules through the interconnect. A BM module receives the packet from the interconnect and stores it in an egress pool. The BM module takes packets from the egress pool and transmits it to a another part of the network or associated circuitry.

16 Claims, 2 Drawing Sheets

|0011000 1|0001 1000 1000|000001110|00011101010|0000111101

"BM MODULE 0"  "BM MODULE 1"  "BM MODULE 2"  "BM MODULE 3"  "BM MODULE 4"

EFFICIENT MEANS TO PROVIDE BACK PRESSURE WITHOUT HEAD OF LINE BLOCKING IN A VIRTUAL OUTPUT QUEUED FORWARDING SYSTEM

FIELD OF THE INVENTION

The present invention relates to digital electronic communication, and in particular to packet type communication using ingress buffers and egress buffers.

BACKGROUND OF THE INVENTION

Digital communication, especially computer networks, often have a large number of users sending out many packets in many different directions, at random times. Individual users are also usually limited on the amount of messages they can receive within a given time period. In a packet communication system, a packet can be received from a sender, pass through various interconnections before reaching a receiver, and then the receiver can be busy receiving a different data packet. If the receiver is unable to receive the packet, the packet is dropped or discarded. Upper level protocols will recognize that the packet was not received, and try to resend a packet. This increases the time required for one user to send the message to another user, and unnecessarily increases the activity in a communication system. This discarding of packets does not only occur between absolute end users, but can occur in any network device which has a plurality of inputs communicating with a plurality of outputs.

In order to minimize the resending of packets, to minimize the activity caused by one message, and to maximize the number of messages that can be sent across a communication network, buffers are used to receive packets at random arrival times, and deliver the packets at an average rate. The receivers of the packets are then design to process packets at the average rate.

Unfortunately it is difficult to determine the average rate. Also providing a buffer large enough to handle a worse case scenario may be very expensive and may be underutilize for a majority of the time. Therefore, a buffer size is chosen based on economical considerations. Buffers therefore occasionally will overflow and data packets will be lost.

SUMMARY AND OBJECTS OF THE INVENTION

It is a primary object of the present invention to reduce the increase in communication activity due to overflowing of buffers. The present invention accomplishes this objective by providing a plurality of Buffer Management (BM) modules or chips, which communicate with each other through an interconnect. The BM modules receive packets from other parts of the network or external circuitry. These incoming packets are stored in an ingress pool. Data packets that a BM module receives from the interconnect are stored in an egress pool. The BM module takes the packets from the ingress pool and sends the packet across the interconnect to one of the other BM modules. A BM module receives the packet from the interconnect and stores it in the egress pool. A BM module takes packets from the egress pool and transmits it to another part of the network or associated circuitry.

The ingress pool is divided in a plurality of ingress queues. Each egress pool is divided into a plurality of egress queues, where each egress queue is associated or corresponds to a different part of the computer network or associated circuitry. Each of the ingress queues in each BM module corresponds to one of the egress queues in the remaining BM modules. In particular, each BM module has an ingress queue for each of all of the egress queues in the other BM modules. Therefore the number of ingress queues in a BM module is equal to a number of the egress queues in all of the remaining BM modules.

The BM modules can only remove packets from an egress queue when the associated computer network or circuitry is able to receive the packet. The BM modules include an ingress arbiter to determine when packets can be removed from an ingress queue and transmitted to the interconnect. The ingress arbiter also determines which ingress queue will supply a packet to the interconnect.

In order to more efficiently operate this system, each BM module keeps track of the state of its egress queues. This status information is shared among all of the BM modules, and is read by the ingress arbiter. When the ingress arbiter has an opportunity to send a packet to the interconnect, it selects a packet from one of the ingress queues. The present invention can use many different types of arbitration which select one choice from a plurality of choices. However, the present invention limits the choices to only those ingress queues whose corresponding egress queues are not full. The choices available to the arbiter algorithm therefore change depending on the latest information on the status of the egress queues.

In a preferred embodiment, an ingress array is provided which has a plurality of bits. Each of the bits represent either a blocked or open state of one of the egress queues. An open state of an egress queue indicates that the egress queue is not completely full, and can accept data packets. A blocked state of the egress queue indicates that the egress queue is full and cannot accept any more data packets. This ingress array is transmitted from one BM module to another in a circular sequential manner. When a BM module receives an ingress array, it stores the ingress array in the BM module, and the ingress arbiter consults the stored ingress array each time a packet is to be sent from an ingress queue to the interconnect. The BM module updates the bits in the ingress array which correspond to its own egress queues, and then the ingress array is transmitted to the next BM module. This occurs continuously from BM module to BM module so that the status of the egress queues is continually updated in each of the BM modules.

In a particularly preferred embodiment, the bits of the ingress array are sent sequentially with each of the BM modules substantially receiving and transmitting a portion of the ingress array substantially simultaneously. This reduces the amount of bandwidth needed to communicate egress queue status information and causes the status information to be continually updated in each of the BM modules at a sufficient rate.

Because the ingress arbiter of the present invention bases its packet selection dependent upon egress queue status, the number of discarded packets can be minimized, and the use of the interconnect can be maximized. This provides for a very efficient transfer of data through the system, without requiring excessively large and expensive buffer memories.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
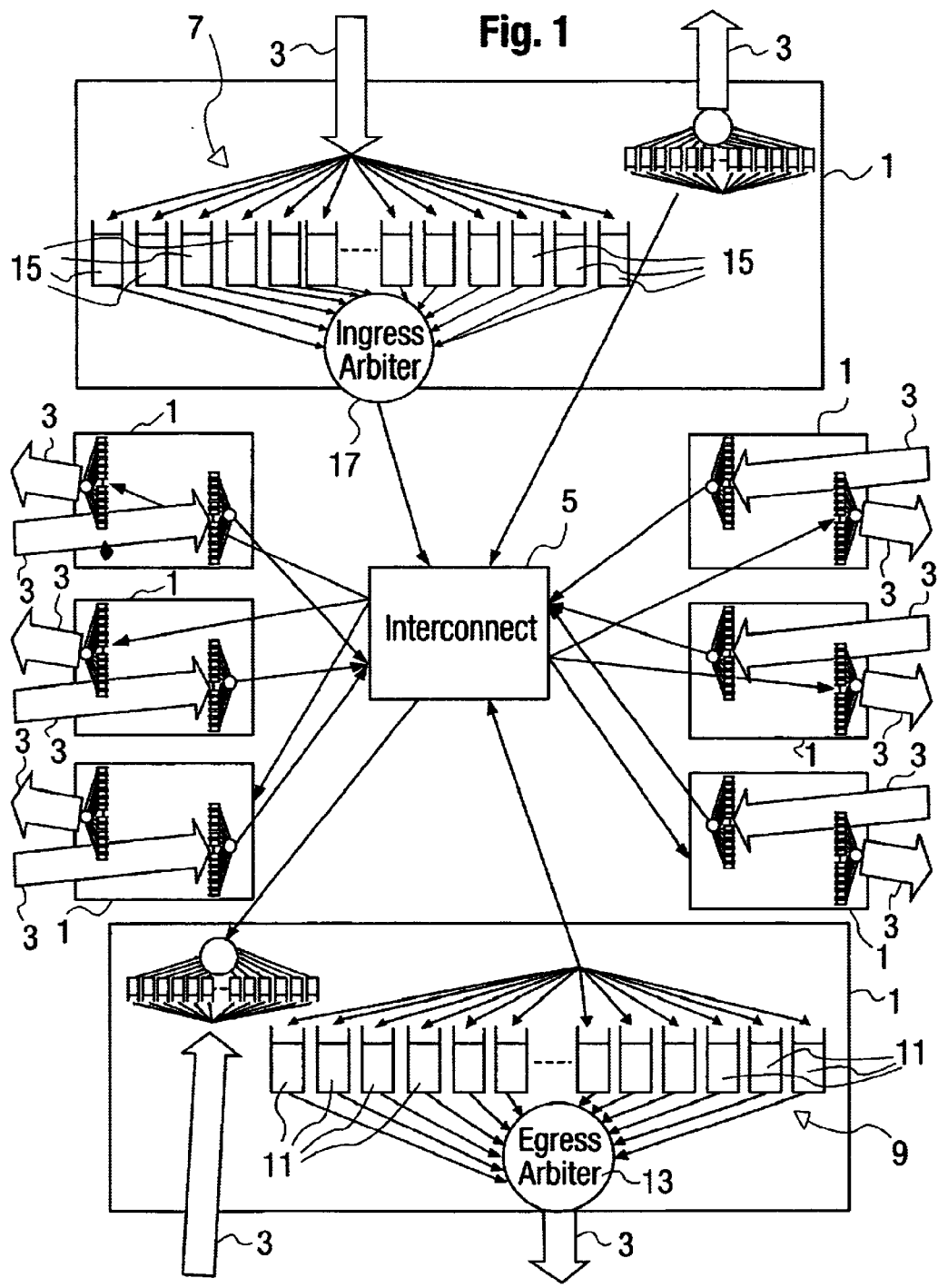
FIG. 1 is a configuration of eight BM modules with two of the modules being large to show detail.

Referring to the drawings, and in particular to FIG. 1, the present invention is a complex interconnect back pressure system for a computer network. A plurality of BM modules or chips 1 receive and transmit packets of data from outside circuitry as show by the fat wide arrows 3. The BM modules 1 transmit and receive the packets across the interconnect 5. A controlling unit, such a CPU, which is not shown, assigns each BM module 1 a consecutive number starting from 0. The CPU informs each BM module 1 of the existence, the egress queue count and the number of each other BM module 1.

Each BM module 1 has a two pools of memory inside it, the ingress pool 7 and the egress pool 9. The ingress pool 7 is used to store packets that are queued to be transmitted across the interconnect 5 to another BM module 1. The egress pool 9 is used to store packets that have been received from the interconnect 5 and are waiting to be transmitted to the exterior circuitry. The egress pool 9 is organized into a plurality of egress queues 11. An egress queue 11 is a portion of memory 9 holding a set of packets to which additional packets are added, or enqueued, when they are received from the interconnect 5. Packets are also removed, or dequeued from the egress queue 11 when they are to be transmitted to the exterior circuitry. The egress queue 11 typically removes packets from a bottom and adds them to a top.

Each egress queue 11 is associated with functional components that understand the exterior circuitry, such as a port type or packet type. Packets that are destined for a particular port and are of a particular packet type are enqueued to the corresponding egress queue 11. Each BM module 1 has one or more egress arbiters 13. The egress arbiter's function is to repeatedly select an egress queue 11 and to dequeue a frame from the selected egress queue 11 The selection is based on a selection algorithm, the egress queue state and the exterior circuitry state. Dequeued frames are usually transmitted to the exterior circuitry.

The ingress pool 7 is organized into a plurality of ingress queues 15. Each ingress queue 15 is associated with preferably one, but possibly more than one egress queues 11 on one of the BM module's 1. In other words for each egress queue 11 on each BM module 1 there is an ingress queue 15 on each BM module 1 associated with it. Therefore, the number of ingress queues 15 on a BM module 1 equals the number of BM modules 1 times the average number of egress queues. Preferably each ingress queue 15 is only associated with one egress queue 11. The BM module 1 has one ingress arbiter 17. The ingress arbiter's function is to repeatedly select an ingress queue 15 and to dequeue a frame from the selected ingress queue 15. The selection algorithm is described below. Dequeued frames are transmitted to the interconnect 5.

The ingress queues 15 are grouped by the BM module 1 that they are associated with. The first set is associated with "BM module 0", the second set "BM module 1", the third set "BM module 2" and so on.

In many cases packets can be enqueued to a egress queue 11 faster, than its BM module 1 can dequeue them. The BM module's dequeue rate is usually limited by the speed of the exterior circuitry and wiring. In such cases the egress queue 11 begins to get longer, which causes the egress memory pool 9 to fill. If the condition continues, then the egress memory pool 9 will overflow at which time packets will be dropped, because there is no place to store them.

Each egress queue is assigned a "watermark". This is an integer number or value, that indicates when the egress queue 11 is considered to be almost full. This number is constantly compared against the sum of the sizes of all packets that are enqueued to the egress queue 11.

Figures 2, 3:
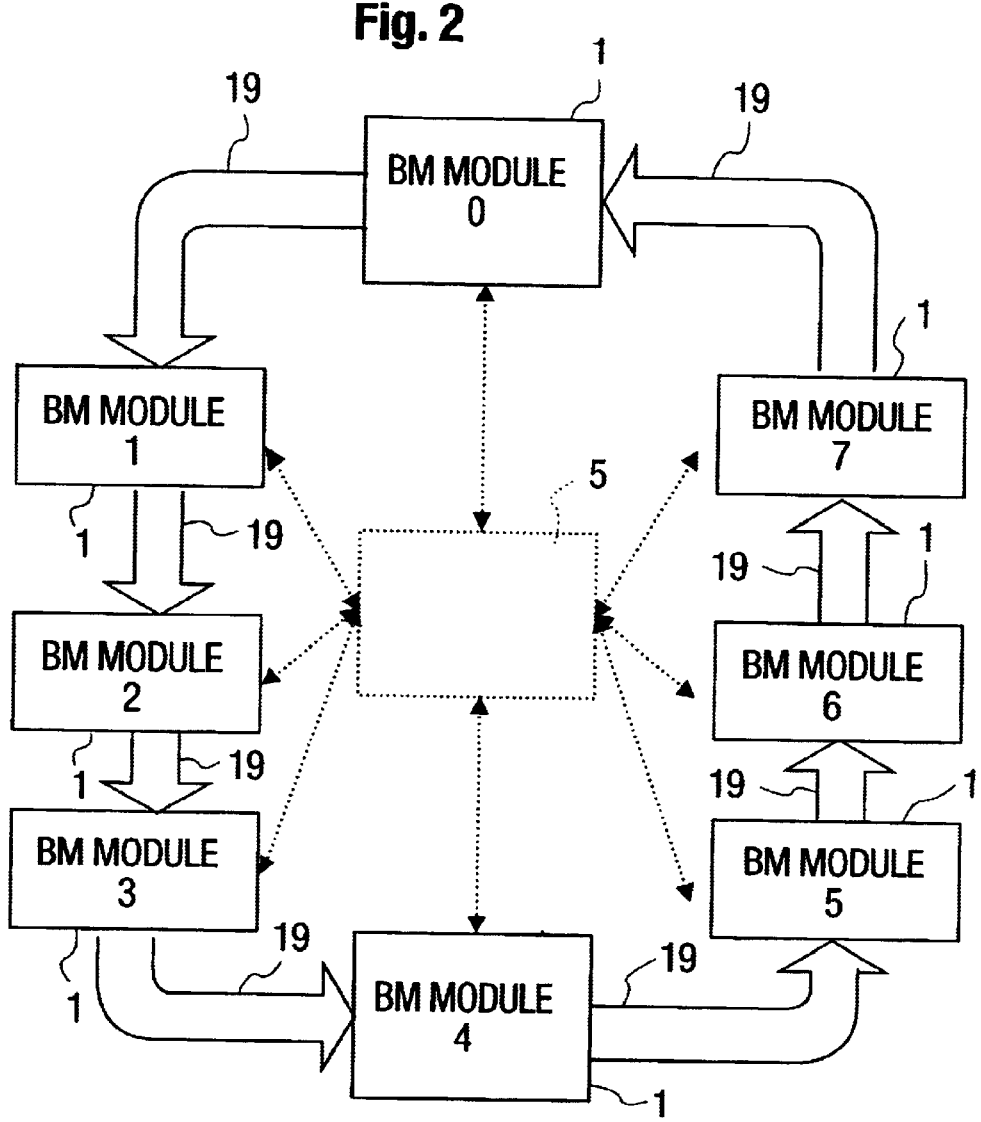
FIG. 2 is a schematic diagram of the present invention showing the sharing of egress queue status information.
FIG. 3 is an example of an ingress array.

Each BM module 1 has an Ingress Queue Blocked Array (IQBA) shown in FIG. 3. The array consists of a series of bits that can have the value one or zero. Each bit in the IQBA corresponds with an ingress queue 15, which corresponds with an egress queue 11. If a bit in the IQBA is one, then the corresponding egress queue 11 is full and the corresponding ingress queues 15 are blocked. If a bit in the IQBA is zero, then the corresponding egress queue 11 has room and the corresponding ingress queues 15 are open. If an ingress queue 15 is blocked, then the ingress arbiter 17, will not select from that ingress queue 15 and thus not dequeue packets from it. The IQBA is organized into sets by BM module 1 just as the ingress queues are.

Since the CPU has configured each BM module 1 with its number and egress queue count each BM module 1 knows which ingress queues 15 are associated with which BM module's egress queues 11, and thus which bits in the IQBA are associated with which egress queues 11 across all the BM modules 1. Consequently, each BM module 1 knows which set of bits in the IQBA is associated with its own egress queues 11.

Each BM module 1 constantly maintains the state of the IQBA bits associated with its own egress queues. For each egress queue 11, that is full beyond its watermark the BM module 1 writes a "1" to the corresponding IQBA bit. For each egress queue 11, that is not full beyond its watermark the BM module 1 writes a "0" to the corresponding IQBA bit.

Each BM module 1 regularly transmits over time its entire IQBA to its neighbor in a circular fashion over a dedicated set of links 19 shown in FIG. 2. The BM modules 1 do so by transmitting a subset of its IQBA to its "right" neighbor in regular time slots. Each BM module 1 maintains a pointer or counter which indicates what the last portion of the IQBA that it sent was. In each time slot, the BM module 1 transmits the following portion of its IQBA. If the BM module 1 has reached the end of the IQBA it starts over at the beginning.

The CPU configures each BM module 1 such that each BM module 1 knows what portion of its neighbor's IQBA it is receiving in a time slot. As a BM module 1 receives a portion of its "left" neighbor's IQBA it replaces the corresponding portion of its IQBA with the received portion. There is one exception: the BM module 1 doesn't replace its IQBA bits if the neighbor is transmitting the IQBA corresponding with its own egress queues 11. An improvement of the invention is for a BM module 1 to skip transmitting the IQBA bits that are associated with its right neighbor's egress queues.

While specific embodiments of the invention have been shown and described in detail to illustrate the application of the principles of the invention, it will be understood that the invention may be embodied otherwise without departing from such principles.

What is claimed is:

1. A back pressure system for a computer network, the system comprising:

an interconnect;

a plurality of Buffer Management (BM) modules, each of said BM modules communicating with each other through said interconnect, said each BM module including a plurality of egress queues and a plurality of ingress queues, each of said ingress queues in each said BM module corresponding to one of said egress queues in remaining said plurality of BM modules;

an ingress array having a plurality of bits, each of said bits representing blocked and open states of one of said egress queues, each said BM module determining blocked and open states of respective said egress queues and setting corresponding said bits to indicate a determined said state;

transmission means for transmitting said ingress array to each of said BM modules;

an ingress arbiter associated with each of said BM modules, each said ingress arbiter selectively choosing one of said ingress queues for communicating through said interconnect, said each ingress arbiter reading said ingress array and only choosing ingress queues which are indicated as opened by said ingress array.

2. The system in accordance with claim 1, wherein:

a number of said plurality of ingress queues in each said BM module is equal to a number of said plurality of egress queues in remaining said BM modules.

3. The system in accordance with claim 1, wherein:

there is a one to one correspondence between said ingress queues in each said BM module and all said egress queues in remaining said BM modules.

4. The system in accordance with claim 1, wherein:

said ingress array is divided into sets, with each set including said bits for one of said BM modules.

5. The system in accordance with claim 1, wherein:

said transmitting includes transmitting said ingress array in a circular sequence through said BM modules.

6. The system in accordance with claim 5, wherein:

said ingress array is divided into sets, with each set including said bits for one of said BM modules;

said each BM module updates a respective said set when said respective said set is transmitted through a respective said BM module.

7. The system in accordance with claim 5, wherein:

said transmitting includes transmitting said bits of said ingress array sequentially through said BM modules.

8. The system in accordance with claim 4, wherein:

said transmitting includes not transmitting one of said sets from a first said BM module to a second said BM module when said one set corresponds to said second BM module.

9. A back pressure method for a computer network, the method comprising the steps of:

providing an interconnect;

providing a plurality of Buffer Management (BM) modules, said each BM module including a plurality of egress queues and a plurality of ingress queues, each of said ingress queues in each said BM module corresponding to one of said egress queues in remaining said plurality of BM modules;

communicating between each of said BM modules through said interconnect;

creating an ingress array having a plurality of bits, each of said bits representing blocked and open states of one of said egress queues determining blocked and open states of respective said egress queues and setting corresponding said bits to indicate a determined said state;

transmitting said ingress array to each of said BM modules;

providing an ingress arbiter associated with each of said BM modules;

selectively choosing one of said ingress queues for communicating through said interconnect, said each ingress arbiter reading said ingress array and only choosing ingress queues which are indicated as opened by said ingress array.

10. The method in accordance with claim 9, wherein:

a number of said plurality of ingress queues in each said BM module is equal to a number of said plurality of egress queues in remaining said BM modules.

11. The method in accordance with claim 9, wherein:

there is a one to one correspondence between said ingress queues in each said BM module and all said egress queues in remaining said BM modules.

12. The method in accordance with claim 9, wherein:

said ingress array is divided into sets, with each set including said bits for one of said BM modules.

13. The method in accordance with claim 9, wherein:

said transmitting includes transmitting said ingress array in a circular sequence through said BM modules.

14. The method in accordance with claim 13, wherein:

said ingress array is divided into sets, with each set including said bits for one of said BM modules;

said each BM module updates a respective said set when said respective said set is transmitted through a respective said BM module.

15. The method in accordance with claim 13, wherein:

said transmitting includes transmitting said bits of said ingress array sequentially through said BM modules.

16. The method in accordance with claim 12, wherein:

said transmitting includes not transmitting one of said sets from a first said BM module to a second said BM module when said one set corresponds to said second BM module.

* * * * *